(12) United States Patent
Kaneda et al.

(10) Patent No.: US 6,486,910 B1
(45) Date of Patent: Nov. 26, 2002

(54) PHOTOGRAPHING APPARATUS HAVING THE IMAGE BLUR PREVENTING FUNCTION

(75) Inventors: Naoya Kaneda, Chigasaki (JP); Kazuhiro Noguchi, Kawasaki (JP); Tadanori Okada, Yokohama (JP); Katsumi Azusawa, Konosu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/037,999

(22) Filed: Mar. 11, 1998

(30) Foreign Application Priority Data

Mar. 12, 1997 (JP) .............................................. 9-074713

(51) Int. Cl.$^7$ .............................................. H04N 5/228
(52) U.S. Cl. .................. 348/208.99; 348/208.5
(58) Field of Search .................. 348/208, 218, 348/219, 207, 335, 333.01, 208.99, 208.2, 208.5, 208.7, 208.9; 396/50, 52, 53, 34, 55; 359/554

(56) References Cited

U.S. PATENT DOCUMENTS

| 5,459,542 A | | 10/1995 | Fujiwara |
| 5,923,368 A | * | 7/1999 | Hirasawa ..................... 348/208 |
| 6,128,035 A | * | 10/2000 | Kai et al. .................... 348/208 |
| 6,130,709 A | * | 10/2000 | Sekine et al. ................ 348/208 |

FOREIGN PATENT DOCUMENTS

JP          8-43769       2/1996

* cited by examiner

*Primary Examiner*—Aung S. Moe
(74) *Attorney, Agent, or Firm*—Fitzpatrick, Cella, Harper & Scinto

(57) ABSTRACT

An apparatus having an image blur correcting function comprises a first unit including an image blur correction apparatus, a second unit rotatable about a first axis differing from a photo-taking optical axis relative to the first unit, a vibration detector provided in the second unit for detecting rotational vibration about the first unit, and a controller for operating the image blur apparatus in conformity with the output of the vibration detector.

19 Claims, 13 Drawing Sheets

PHOTOGRAPHING APPARATUS HAVING THE IMAGE BLUR PREVENTING FUNCTION

BACKGROUND OF THE INVENTION

1. Field of the Invention

This invention relates to an apparatus having an image blur correcting function for use in a video camera, a digital still camera or the like.

2. Related Background Art

Image pickup apparatuses (cameras) having a solid state image pickup element such as CCD on an imaging plane, such as video cameras and digital cameras, have heretofore been generalized. There are various sizes of image pickup elements such as CCD's used in these image pickup apparatuses, and generally, as the number of pixels is increased, the size of the CCD becomes larger, and correspondingly, the cost increases. From these conditions, what is called ¼ inch size, in which the diagonal length is in the order of 4 mm, or what is called ⅓ inch size, in which the diagonal length is in the order of 6 mm, is often conventionally used. Also the number of pixels of these CCD's is generally 300,000 to 400,000.

Thus, the image size of these image pickup apparatuses is small compared with the 43 mm diagonal of a 135 film silver halide camera. Therefore, in lenses of the same angle of view, great downsizing is generally possible relative to the lenses of 135 film cameras. In fact, in video cameras using a CCD of ¼ inch, a zoom lens having a zoom ratio of 10 and having a full length in the order of 50 mm is popular.

However, when such a zoom lens is mounted on a compact and light-weight video camera or digital still camera, there arises the problem that particularly in photographing wherein the focal length is set to a relatively long focus side, it is difficult due to hand vibration to obtain a stable image field. From such circumstances, various hand vibration preventing apparatuses have heretofore been proposed.

If a vibration preventing apparatus of this kind is used, not only the harmful vibration of the image field due to such hand vibration will be eliminated, but also a great effect will of course be achieved under such circumstances that in case of photographing from a ship or an automobile, harmful vibration cannot be eliminated even if a tripod is used.

The vibration preventing apparatus of this kind is provided with at least vibration detection means for detecting vibration, and blur correction means for effecting any correction in conformity with the information of the detected vibration so that blur may not occur as the image field.

As the vibration detection means, there are known, for example, an angular acceleration meter, an angular velocity meter, an angular displacement meter, etc. Also as the blur correction means, there are known optical means using a variable apex-angle prism or using the effect of shifting a part of a photo-taking optical system in a plane perpendicular to a photo-taking optical axis to bend the photo-taking optical axis as a result, and electronic means for sequentially changing (pursuing), in a video camera designed to cut out an area actually used as an image field from obtained image pickup image field information, the cutting-out position to a position in which vibration is corrected. However, the latter case is a correcting method among continuous image fields in a moving picture, and is not effective as the correction means in the case of a still picture.

Generally, optical correction means is capable of effecting correction to a vibration within an angle determined as the vibration correction angle of a camera irrespective of the focal length of the lens thereof, and accordingly, even when the focal length of a zoom lens on the telephoto side (the long focal length side) thereof is long, it is possible to have the capability of eliminating any vibration which poses no problem in practical use.

FIGS. 11A, 11B and 11C of the accompanying drawings illustrate the relation between the focal length and the vibration angle of a camera in the prior art at an object position on the image field. In FIG. 11A, the optical axis of the lens when the camera is at a position indicated by 112 is 113 and thus, the face of a person 111 which is an object is caught substantially at the center of the image field. Let it be assumed that from this state, the camera has been rotated through a degrees by hand vibration. The position of the camera at this time is indicated by 114 and the optical axis is indicated by 115.

FIGS. 11B and 11C show the position of the image field in this camera position indicated by 112 and 114, FIG. 11C shows the state of a zoom lens at the telephoto end (the end of the long focal length side), and FIG. 11B shows the state of the zoom lens at the wide end (the end of the short focal length side). The reference numeral 116 designates an object in the image field, the reference numerals 117 and 119 denote the respective image fields when the camera position is 112, and the reference numerals 118 and 120 designate the respective image fields when the camera position is 114.

As is apparent from FIGS. 11A to 11C, even if the camera vibration is of the same a degrees, the harm is greater as the vibration on the image field as a matter of course when the focal length of the lens is long. Accordingly, if it is combined with a lens having long focal length particularly on the telephoto side, the effect thereof is remarkable.

FIGS. 12A to 12C, 13A, 13B, 14 and 15 of the accompanying drawings show a construction using a variable apex-angle prism as an example of the blur correction means according to the prior art.

FIGS. 12A to 12C show the construction of the variable apex-angle prism itself. In these figures, the reference numerals 121 and 123 designate glass plates, and the reference numeral 127 denotes a bellows portion made of a material such as polyethylene. Transparent liquid 122 such as silicon oil is enveloped in the interior surrounded by the glass plates 123 and the bellows 127. In FIG. 12B, the two glass plates 121 and 123 are in a parallel state, and the angle of incidence and the angle of emergence of the ray of light of the variable apex-angle prism in this case are equal to each other. On the other hand, when as shown in FIGS. 12A and 12C, the glass plates have angles with respect to each other, the ray of light is bent at a certain angle as indicated by a ray of light 124 in FIG. 12A and a ray of light 126 in FIG. 12C.

Accordingly, vibration can be eliminated by controlling the angle of the variable apex-angle prism provided in front of a lens so that when the camera is inclined by a cause such as hand vibration, the ray of light may be bent by an amount corresponding to the angle of the inclination. FIGS. 13A and 13B show such state, and in FIG. 13A, assuming that the variable apex-angle prism becomes parallel and the ray of light catches the head of the object, there is shown a state in which by a correction for driving the variable apex-angle prism for a vibration of a degrees as shown in FIG. 13B to thereby bend the ray of light, the photo-taking optical axis still continues to catch the head of the object again in this case.

FIG. 14 shows an example of the actual construction of a variable apex-angle prism unit including a variable apex-angle prism and an actuator portion for driving it, and an apex-angle sensor for detecting an angle state. Actual vibrations appear in all directions and therefore, the front glass surface and rear glass surface of the variable apex-angle prism are designed to be rotatable with directions which are 90° out of phase with each other as a rotational axis. Also, here, suffixes a and b indicate respective constituents in the two directions of rotation, and the constituents given the same reference numerals are entirely the same in function. Accordingly, description will hereinafter be made with the suffixes a and b omitted. The parts on the b side are partially not shown.

In FIG. 14, the reference numeral 141 designates a variable apex-angle prism comprising glass 121, 123, a bellows portion 127, a liquid, etc. The glass plates 121 and 123 are integrally attached to holding frames 128a, 182b with an adhesive agent or the like. Each holding frame 128a, 128b constituents a rotary shaft portion 133a, 133b between itself and a fixed part (not shown) and is rotatable about this shaft. The shafts 133a and 133b differ in direction by 90° from each other. Each coil 135a, 135b is integrally provided on the holding frame 128a, 128b, respectively, while on the other hand, each magnet 136a, 136b, and yokes 137a, 137b and 138a, 138b are provided on a fixed portion (not shown). Accordingly, by electric current being supplied to coils 135a, 135b, the variable apex-angle prism 141 is rotated about its shafts 133a, 133b. There is a slit 129a in the tip end of an arm portion 130a integrally extending from the holding frame 128a, and an apex-angle sensor for detecting the angle state of the variable apex-angle prism is constituted between a light emitting element 131 a such as an iRED and a light receiving element 142a such as a PSD provided on the fixed portion.

FIG. 15 is a block diagram showing a vibration preventing apparatus provided with this variable apex-angle prism 141 as blur correction means, in combination with a lens.

In FIG. 15, the reference numeral 141 designates the variable apex-angle prism, the reference numerals 143 and 144 denote apex-angle sensors, the reference numerals 153 and 154 designate amplification circuits for amplifying the outputs of the apex-angle sensors to a predetermined level, the reference numeral 145 denotes a microcomputer, the reference numerals 146 and 147 designate vibration detection means constituted by angular velocity meters or the like, the reference numerals 148 and 149 denote actuators comprising the aforementioned coils 135a and 135b to the yokes 138a and 138b, respectively, and the reference numeral 152 designates a lens.

In the microcomputer 145, an electric current supplied to the actuators 148 and 149 is determined in order to control the variable apex-angle prism 141 to an angle state optimum to eliminate any vibration on the image field, in conformity with the angle state of the variable apex-angle prism 141 detected by the apex-angle sensors 143 and 144, and the result of the detection by the vibration detection means 146 and 147. The reason why in FIG. 15, the main blocks are shown as two systems is that it is assumed that the control in two directions which are 90° out of phase with each other is individually effected.

Also, there have recently announced various forms of the layout of an image pickup apparatus such as a video camera or a digital still camera. Among them, there are nowadays particularly often seen image pickup apparatuses (cameras) of such layout in which a so-called camera portion including a photo-taking lens portion and a solid state image pickup element such as a CCD, and in the case of a video camera, a recorder portion comprising a mechanical portion for effecting recording and reproduction on a tape or the like, and a liquid crystal panel for displaying a recorded image and a reproduced image are rotatably constructed.

FIGS. 16A to 16C and FIGS. 17A and 17B of the accompanying drawings show video cameras of such conventional layout.

FIG. 16A is a front view of a video camera, FIG. 16B is a left side view thereof, and FIG. 16C is a right side view thereof. The reference numeral 240 designates a camera portion including at least a lens and a solid state image pickup element such as a CCD, the reference numeral 241 denotes a recorder portion which includes a recorder for recording an image photographed by a camera portion, the reference numeral 242 designates a photo-taking lens, the reference numeral 243 denotes a photo-taking optical axis, and the reference numeral 246 designates a coupling portion between the recorder portion and the camera portion which are rotatably coupled to each other. The reference numeral 248 denotes a liquid crystal panel as a viewfinder for displaying an image photographed by a camera portion as a finder image, and the reference numeral 247 designates the center of rotation of the liquid crystal panel. The camera portion 240 rotates about the center of rotation 246, and for example, becomes capable of photographing having an elevation angle like a state 245 indicated by dots-and-dark lines. And then optical axis is indicated by 244. Also, if the recorder portion 241 is rotated through 360° relative to the lens portion 242 and the lens is turned toward a photographer, so-called face-to-face photographing will become possible. The liquid crystal panel rotates about a center of rotation 247, and can assume, for example, the state of a dots-and-dash position 249.

FIG. 17A is a front view of a video camera provided with a more compact camera portion, and FIG. 17B is a left side view thereof, and in this case, the camera portion 240 rotates about a center of rotation 246, and when it assumes the position of dots-and-dash lines 250, there can be realized an image pickup apparatus which is generally flat and excellent in portability.

Now, in the above-described examples of the prior art, when a photo-taking lens having optical blur correction means is used for blur correction and the piezo-electric vibration gyroscope or the like of an angular velocity meter for directly measuring the rotation of the camera is used as vibration detection means, an optimum construction has not been presented regarding the disposition of these detection means. For example, when the vibration detection means is disposed on the recorder side, a vibration in yaw direction (lateral vibration) as detected by the camera body when the camera portion is used while rotating relative to the recorder portion does not reflect the elevation angle of the camera portion and therefore, there is the problem that normal correction cannot be done unless the lateral vibration is corrected in accordance with the elevation angle of the camera and is replaced with the amount of movement of the blur correction means.

SUMMARY OF THE INVENTION

One aspect of the invention is an apparatus having the image blur correcting function which has a first unit including image blur correction means for correcting image blur, a second unit rotatable about a first axis differing from a photo-taking optical axis relative to the first unit, vibration detection means provided in the second unit for detecting the rotational vibration about the first axis, and control means for operating the image blur correction means in conformity with the output of the blur correction means, and which can effect normal image blur correction even when in a video camera or the like wherein only a camera portion is rotatable, only the camera portion has an elevation angle.

Another aspect of the invention is an apparatus having the image blur correcting function which has a first unit including image blur correction means for correcting image vibration, a second unit rotatable about a first axis differing from a photo-taking optical axis relative to the first unit, vibration detection means provided in the second unit for detecting rotational vibration about a second axis differing from both of the photo-taking optical axis and the first axis, signal correction means for correcting the output signal of second vibration detection means in conformity with the rotated state of the second unit relative to the first unit, and control means for operating the image blur correction means in conformity with a vibration signal obtained by the signal correction means, and which can effect normal image blur correction even when in a video camera or the like wherein only a camera portion is rotatable, only the camera portion has an elevation angle.

Another aspect of the invention is an apparatus having the image blur correcting function which has a first unit including image blur correction means for correcting image blur, a second unit rotatable about a first axis relative to the first unit, first vibration detection means provided in the second unit for detecting rotational vibration about the first axis, second vibration detection means provided in the first unit for detecting rotational vibration about a second axis differing from the first axis, and control means for operating the image blur correction means in conformity with the output signal of the first vibration detection means and the output signal of the second vibration detection means, and which can effect normal image blur correction even when in a video camera or the like wherein only a camera portion is rotatable, only the camera portion has an elevation angle.

Another aspect of the invention is an apparatus having the image blur correcting function which has a first unit including image blur correction means for correcting image blur, a second unit rotatable about a first axis relative to the first unit, first vibration detection means provided in the first unit for detecting rotational vibration about the first axis, second vibration detection means provided in the first unit for detecting rotational vibration about a second axis differing from the first axis, and a microcomputer provided in the second unit for operating the image blur correction means in conformity with the output signals of the first and second vibration detection means, and which can effect normal image blur correction even when in a video camera or the like wherein only a camera portion is rotatable, only the camera portion has an elevation angle.

Other objects and modes of the present invention will become apparent from the following detailed description of the invention.

DESCRIPTION OF THE PREFERRED EMBODIMENTS

First Embodiment

A first embodiment of the present invention will hereinafter be described with reference to the drawings.

FIGS. 1 to 4 are concerned with the first embodiment of the present invention.

Figure 1:
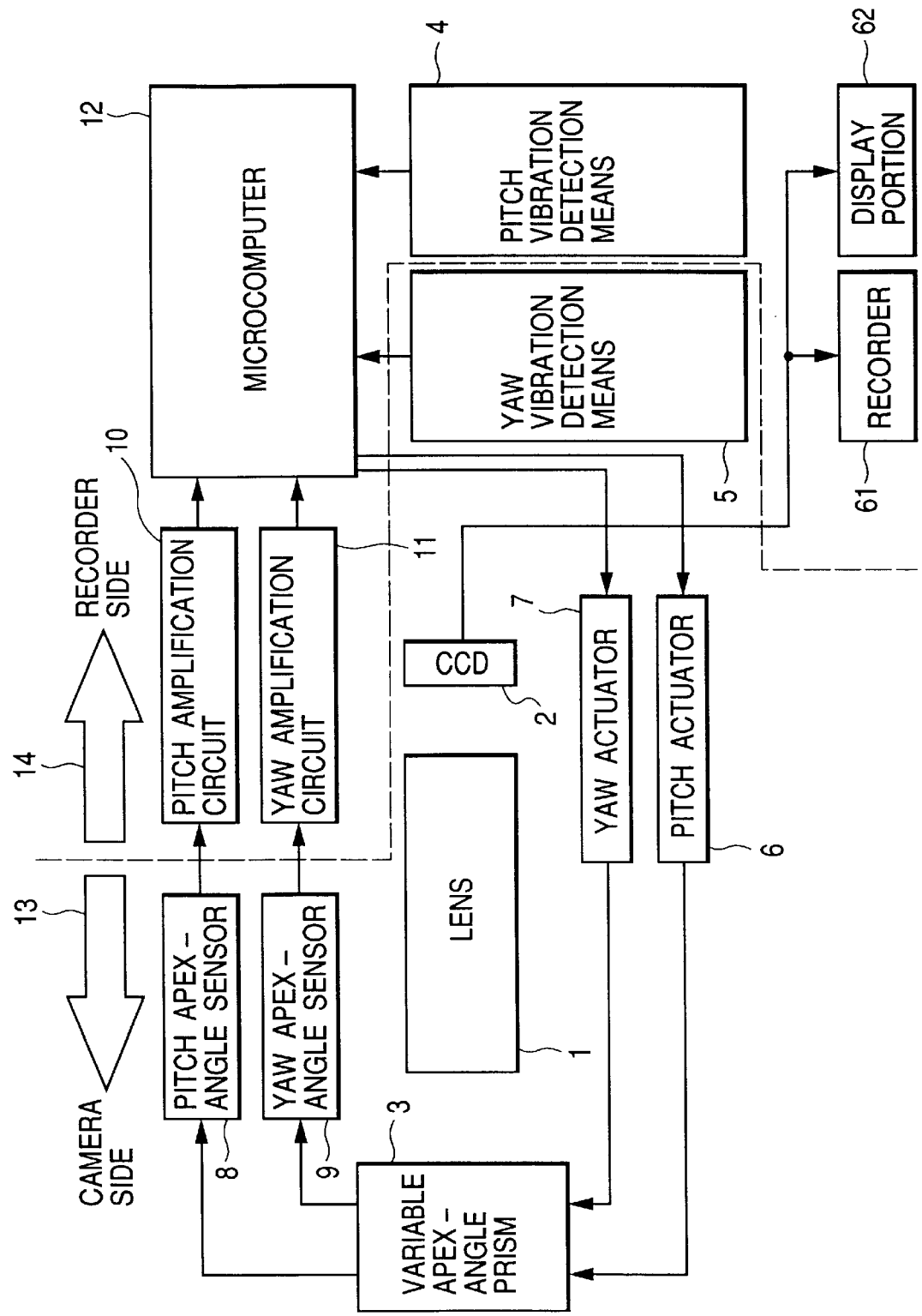
FIG. 1 is a block diagram of the vibration preventing apparatus of an image pickup apparatus according to a first embodiment of the present invention.

FIG. 1 is a block diagram of the vibration preventing apparatus of an image pickup apparatus according to the first embodiment of the present invention.

Figure 2:
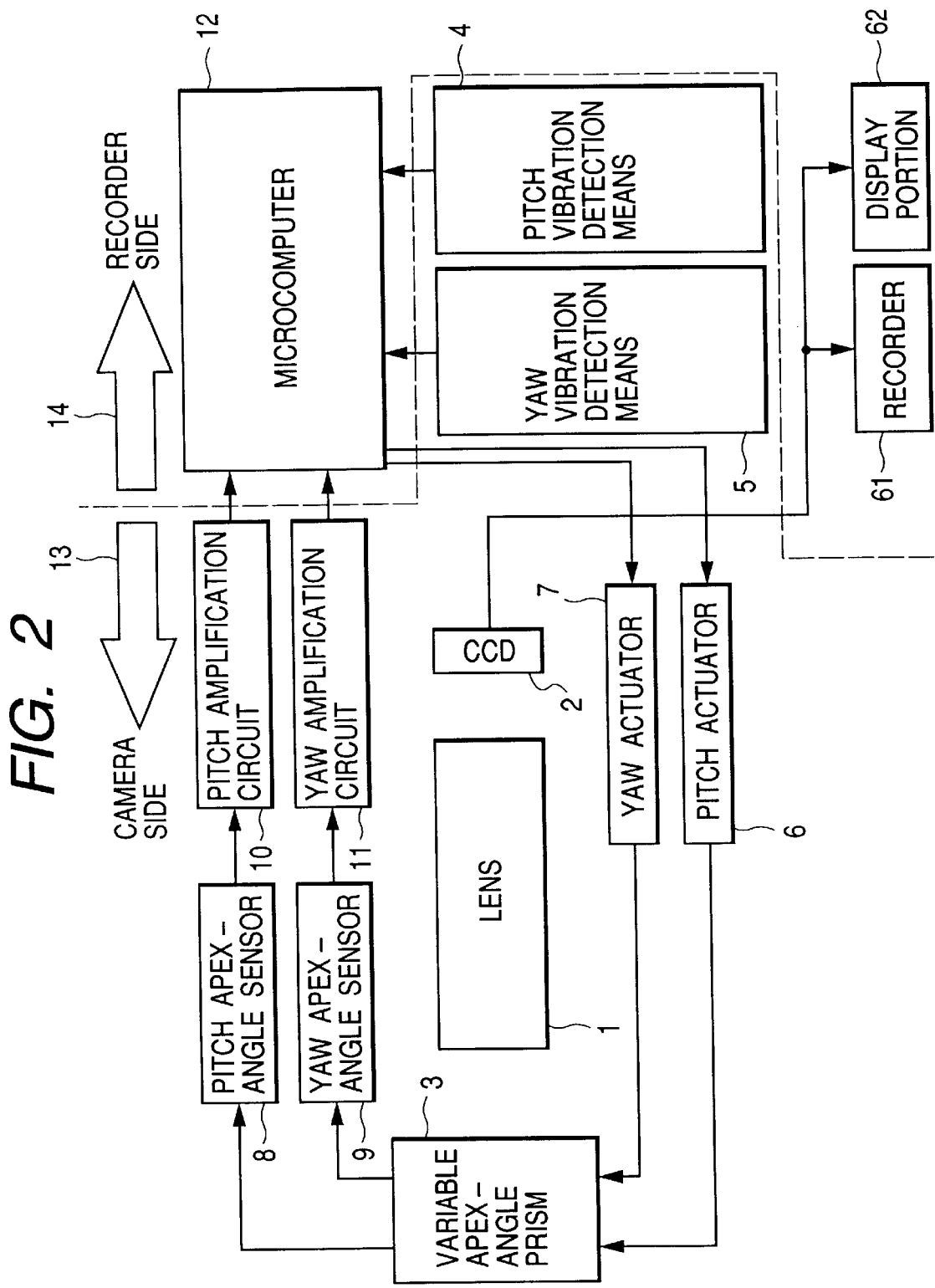
FIG. 2 is a block diagram when in the vibration preventing apparatus shown in FIG. 1, vibration detection means in pitch direction is also disposed on a camera side.

FIG. 2 is a block diagram when in the vibration preventing apparatus shown in FIG. 1, vibration detection means in pitch direction and an amplification circuit for pitch are disposed on a camera side.

Figure 3:
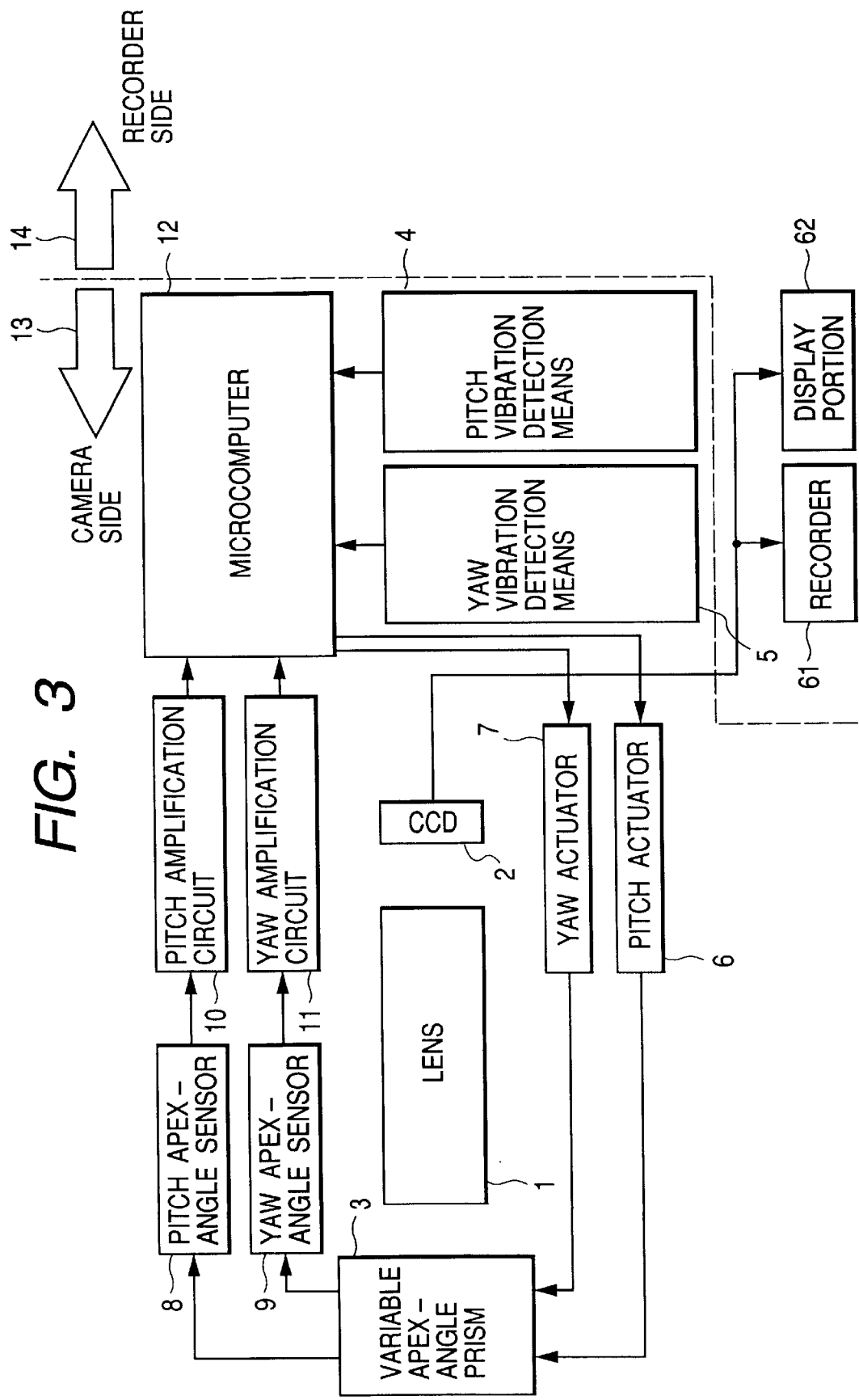
FIG. 3 is a block diagram when in the vibration preventing apparatus shown in FIG. 1, vibration detection means in two directions and a microcomputer are also disposed on the camera side.

FIG. 3 is a block diagram when in the vibration preventing apparatus shown in FIG. 1, vibration detection means in two directions and a microcomputer are also disposed on the camera side.

Figure 4:
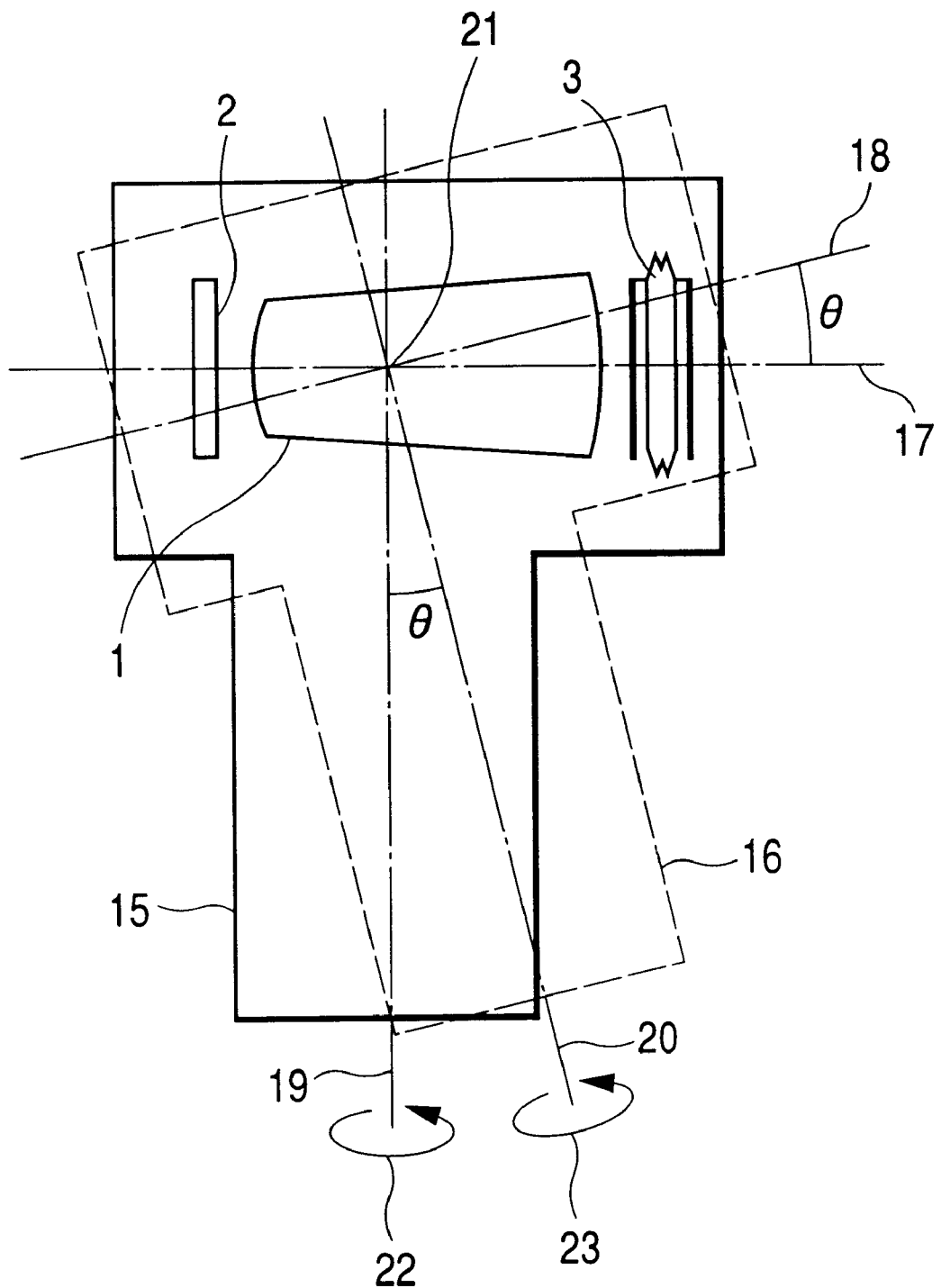
FIG. 4 is a side view of the body of the camera shown in FIG. 1.

FIG. 4 is an illustration of the elevation angle of the camera shown in FIG. 1.

In FIG. 1, the reference numeral 1 designates a phototaking lens, the reference numeral 2 denotes a solid state image pickup element such as a CCD, and the reference numeral 3 designates a variable apex-angle prism as blur correction means disposed forwardly by the photo-taking lens. The blur correction means is not restricted to a construction using a variable apex-angle prism, but may be of a construction of the shift type in which some lens units constituting a photo-taking lens are shift-controlled in a plane perpendicular to a photo-taking optical axis, or of a construction of the rotation type in which some lens units constituting a photo-taking lens are rotated about a predetermined center of rotation. The reference numeral 4 denotes means for detecting a vibration component (the amount of rotation by the hand vibration of the camera) in pitch direction (vertical direction) such as the piezoelectric vibration gyroscope as previously described with respect to the prior art. The reference numeral 5 designates means for detecting a vibration component in yaw direction (lateral direction).

The reference numeral 6 denotes an actuator which effects the driving of the variable apex-angle prism in pitch direction, the reference numeral 7 designates an actuator which effects the driving of the variable apex-angle prism in yaw direction, and the reference numeral 8 denotes an apex-angle sensor for detecting the apex-angle state of the prism in pitch direction. The apex-angle sensor 8 is comprised of a photointerrupter or the like. The reference numeral 9 designates an apex-angle sensor for detecting the apex-angle state of the prism in yaw direction, the reference numeral 10 denotes an amplification circuit for applying predetermined amplification to the output of the apex-angle sensor in pitch direction, the reference numeral 11 designates a yaw side amplification circuit, and the reference numeral 12 denotes a microcomputer.

It is to be understood here that each constituent within the left range of the broken line which is indicated by arrow 13 is disposed on the camera side, for example, in the image pickup apparatus of the layout according to the prior art as shown in FIGS. 16A to 16C and FIGS. 17A and 17B wherein the camera portion and the recorder portion are rotatable, and each block at the right of the broken line which is indicated by arrow 14 is disposed on the recorder side. The reference numeral 61 denotes a recorder for recording a photographed image and the reference numeral 62 denotes a display portion comprising a liquid-crystal display displaying a photographed image as a finder image and a display control portion. The recorder 61 and the display portion 62 are both located on the recorder portion 14 such as shown in FIGS. 1 to 3 and 7.

FIG. 2 shows an example in which constituents are entirely the same as those in FIG. 1, but which differs from the embodiment of FIG. 1 in that at the position of the arrow and broken line separately indicating the camera side and the recorder side, not only the yaw vibration detection means 5, but also the pitch vibration detection means 4, the pitch amplification circuit 10 and the yaw amplification circuit 11 are disposed on the camera 13 side.

Also, FIG. 3 shows an example in which constituents are the same as those in FIGS. 1 and 2, but all constituents including the microcomputer are disposed on the camera 13 side.

Thus, in any of the examples shown in FIGS. 1 to 3, at least the yaw side vibration detection means is disposed on the camera side.

FIG. 4 is a left side view of the camera shown in FIG. 1, and the reference numeral 15 designates a camera case during the horizontal state thereof, the reference numeral 16 denotes the position of the camera case when moved upwardly at an elevation angle θ, the reference numeral 17 designates the optical axis during the horizontal state, the reference numeral 18 denotes the optical axis when the camera case is moved upwardly at the elevation angle θ, the reference numeral 19 designates the rotational axis of the rotation 22 of the camera during the horizontal state thereof, the reference numeral 20 denotes the rotational axis of the rotation 23 at the elevational angle θ, and the reference numeral 21 designates a coupling portion and the fulcrum of rotation. The reference numeral 1 designates a lens and the reference numeral 2 designates a solid state image pickup element.

Operation will now be described.

Assuming that in the apparatus as shown in FIGS. 1 to 3, the camera has been rotated through 0.1 degree in yaw direction by hand vibration, the variable apex-angle prism 3 can be driven to return the optical axis through 0.1 degree in yaw direction, thereby preventing vibration on the imaging plane, but assuming that at this time, the camera has a certain elevation angle θ as indicated by broken line in FIG. 4, if the vibration detection means is disposed on the recorder side, the detection means will always measure the rotation 22 about the axis 19 even if the elevation angle of the camera portion changes, whereas if as in the present embodiment, the vibration detection means is disposed on the camera 13 side, the detection of the rotation 23 about the axis 20 will become possible for an elevation angle θ when there is the elevation angle θ.

As described above, according to the present embodiment, almost all of lateral vibrations appearing on the imaging plane are created by the above-described component about the axis 20 and therefore, by at least the yaw side sensor being disposed on the camera side as in the present embodiment, it becomes possible to effect vibration prevention accurately independently of the elevation angle state.

In FIG. 1, the amplification circuits 8, 9, the pitch vibration detection means 4 and the microcomputer 12 are disposed on the recorder 14 side. This is because with a case where there is no space for disposing these blocks on the camera 13 side taken into account, only the necessary minimum blocks are disposed on the camera 13 side, and it is an example suitable for the downsizing of the camera.

Also, in FIG. 2, there is shown an example in which only the microcomputer 12 is disposed on the recorder 14 side and all the other constituents are disposed on the camera 13 side, but for example, to eliminate the adverse effect of noise to the utmost and obtain a detection signal of good S/N when the outputs of the apex-angle sensors 8 and 9 are minute, it is generally preferable to dispose the amplification circuits near the sensors, as shown in FIG. 2.

Also, in FIG. 3, there is shown an example in which the constituents concerned in vibration prevention are all disposed on the camera 13 side, but they may be disposed thus as an extension of the example of FIG. 2. Also, the microcomputer may be used also as a microcomputer for effecting image recording control.

Second Embodiment

A second embodiment of the present invention will now be described with reference to the drawings.

Figure 5:
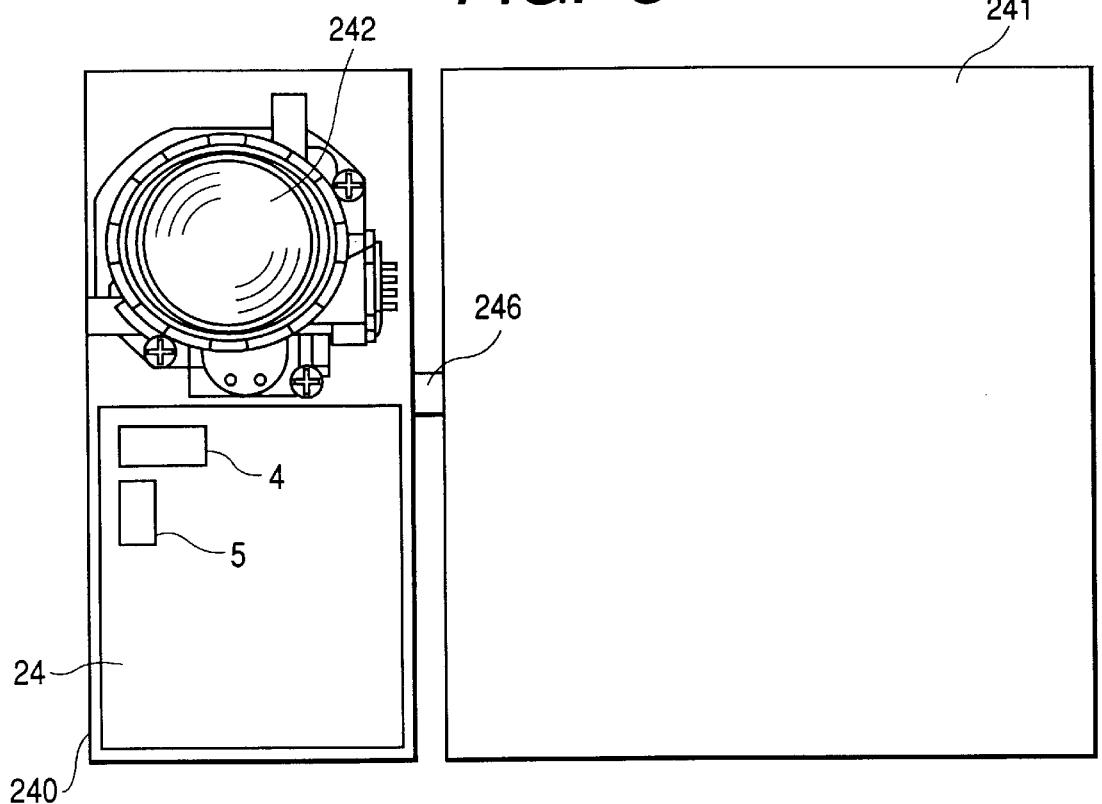
FIG. 5 is a front view of an image pickup apparatus according to a second embodiment of the present invention.

FIG. 5 is a front view of an image pickup apparatus according to the second embodiment of the present invention.

In FIG. 5, the reference numeral 24 designates a substrate on which the pitch vibration detection means 4, the yaw vibration detection means 5, etc. are actually mounted.

The second embodiment regards the layout when a sensor such as a commercially available piezoelectric vibration gyroscope is actually mounted on the substrate.

As shown in FIG. 5, a rotatable camera portion 240 coupled to a recorder portion 241 by a coupling portion 246 has a lens portion 242 disposed on the upper portion thereof and has a substrate 24 disposed below the lens 242. This substrate 24 is constructed so as to have a width generally equal to the full width of the lens 242, and the pitch vibration detection means 4 and the yaw vibration detection means 5 are actually mounted on the substrate 24.

In this case, it is desirable to layout the substrate 24 and the vibration detection means 4, 5 so as to be within the projection range of the lens 242 in the direction of the optical axis of the lens 242 when viewed from above them. By laying out them in this manner, a wasteful space can be abolished and the camera portion 240 can be constructed compactly.

Third Embodiment

A third embodiment of the present invention will now be described with reference to the drawing.

Figure 6:
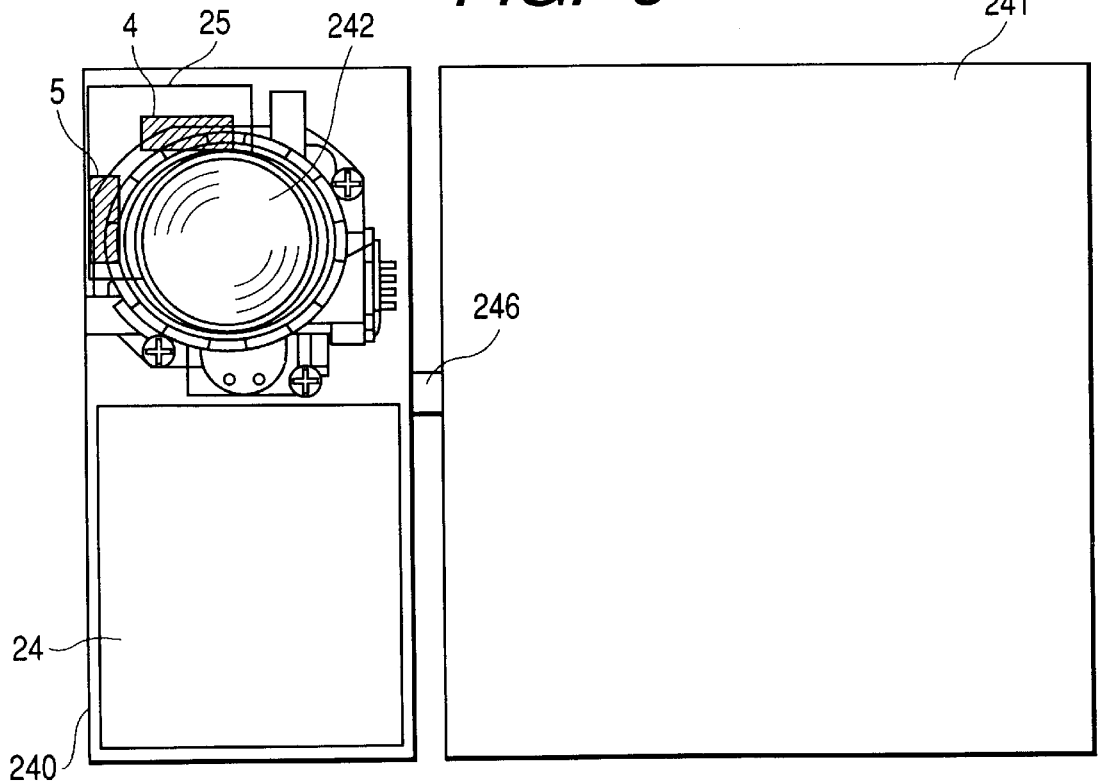
FIG. 6 is a front view of an image pickup apparatus according to a third embodiment of the present invention.

FIG. 6 is a front view of an image pickup apparatus according to the third embodiment of the present invention.

In FIG. 6, the reference numeral 25 designates a substrate for actually mounting the vibration detection means 4 and 5 thereon. In the other points, the construction of the third embodiment is the same as the construction of FIG. 5, and the same constituents as those in FIG. 5 are given the same reference numerals and need not be described.

In the layout of the second embodiment, the vibration detection mean are actually mounted on the substrate 24 disposed below the lens 242, but in the third embodiment, the vibration detection means are actually mounted on the substrate 25 around the lens 242, and the vibration detection means 4 and 5 are disposed so as to be able to cope also with the layout of the compact camera as shown, for example, in FIG. 19 wherein the substrate 24 is absent.

As shown in FIG. 6, the vibration detection means 4 and 5 are actually mounted on the substrate 25, and are disposed around the lens 242. This position is a position at which the actuator for driving the blur correction means and many portions of the vibration detection means overlap one another as viewed from ahead of the lens 242 when a lens having blur correction means of the shift type is supposed or when the variable apex-angle prism is disposed rearwardly of the internal stop of a conventional lens, and which avoids the convex portion of each actuator or the like in the direction of the optical axis. Thereby, the layout of the camera portion can be disposed compactly and efficiently.

Fourth Embodiment

A fourth embodiment of the present invention will now be described with reference to the drawings.

Figure 7:
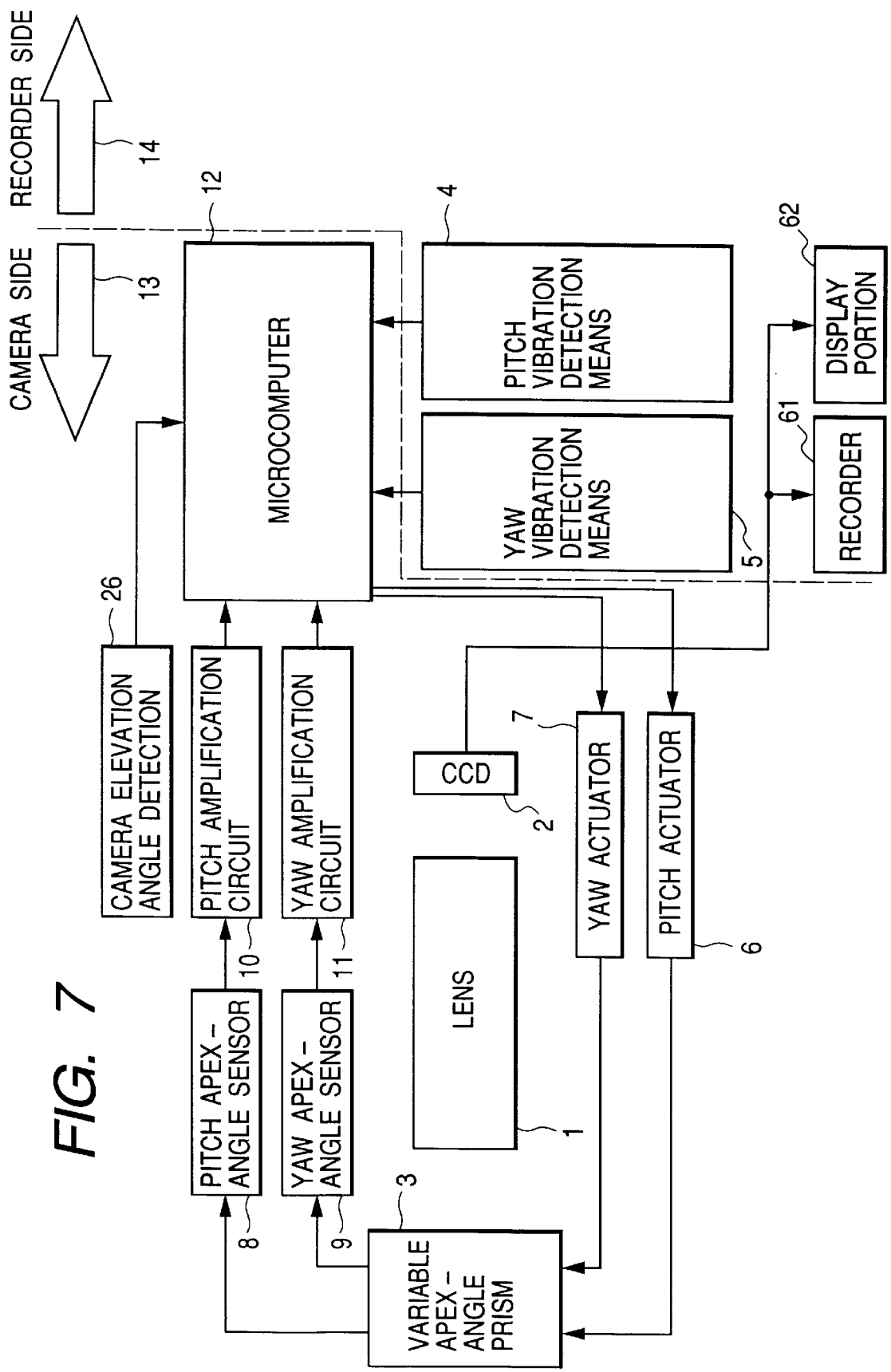
FIG. 7 is a block diagram of the vibration preventing apparatus of an image pickup apparatus according to a fourth embodiment of the present invention.

FIG. 7 is a block diagram of the vibration preventing apparatus of an image pickup apparatus according to the fourth embodiment of the present invention.

Figure 8:
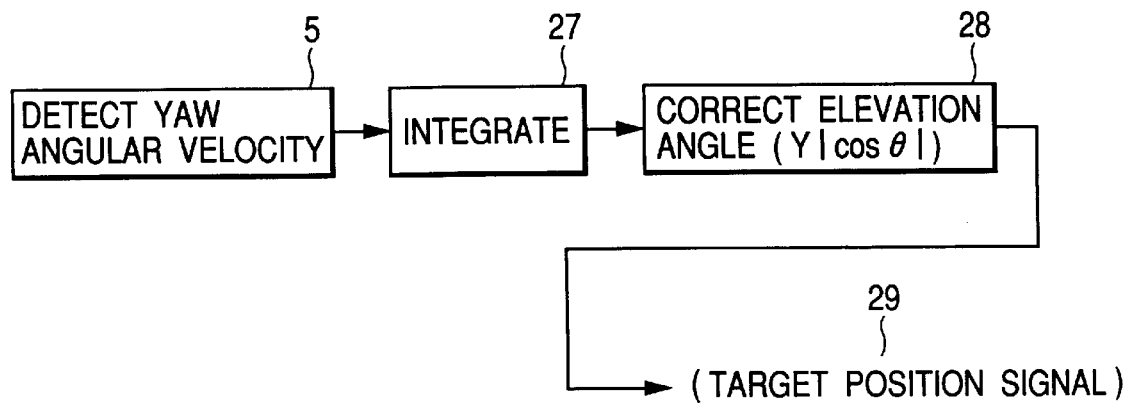
FIG. 8 is a diagram showing the sequence of the elevation angle correction of the vibration preventing apparatus shown in FIG. 7.

FIG. 8 is a diagram showing the sequence of the elevation angle correction of the vibration preventing apparatus shown in FIG. 7.

In FIG. 7, the reference numeral 26 designates camera elevation angle detection means provided on the camera 13 side. The camera elevation angle detection means 26 serves to detect the elevation angle θ of the camera portion as shown, for example, in FIG. 4 relative to the recorder portion, and as a specific system thereof, use can be made of a conventional sensor such as a volume, a pulse plate, an optical sensor (such as a position sensor) or a magnetic type sensor (such as a Hall element).

In the fourth embodiment shown in FIG. 7, both of the pitch vibration detection means 4 and the yaw vibration detection means 5 are disposed on the recorder 14 side.

That is, the fourth embodiment intends to correct the result of detection and effect the right blur correction of the camera when the elevation angle of the camera portion changes in a case where the vibration detection means cannot be disposed in the camera portion from the desire to downsize the camera portion.

Operation will now be described with reference to FIG. 8.

As shown in FIG. 8, the vibration on the yaw side is first detected by the vibration detection means provided on the recorder 14 side in the vibration detection block 5. The result of this detection is integrated by the next integration block 27 and is used as position information. Next, in the elevation angle correction block 28, it is multiplied by an elevation angle correction value |cos θ| detected by the camera elevation angle detection means 26, and an elevation angle error is corrected and a target position signal 29 for blur correction is calculated. The integration block 27 and the elevation angle correction block 28 in this elevation angle correction sequence correspond to the processing in the microcomputer 12, and the target position signal 29 is obtained.

Thereafter, as is generally known, feedback control is effected so that this target position and the apex angle of the variable apex-angle prism or the shift lens position may assume that position, and is effected with an adjusting portion for gathering gains provided between the target signal and the apex-angle or the shift position so that accurate correction may be effected.

Thus, according to the fourth embodiment, the error when an elevation angle has been given can be corrected by the multiplication of |cos θ| by elevation angle correction even if the vibration detection means in yaw direction is provided on the recorder 14 side. However, here, the lateral vibration of the center of the image field can be corrected, but the correction regarding the movement of the image in the roll direction about the center of the image field caused by the rotation 22 about the axis 19 as shown, for example, in FIG. 4 is not effected (originally, the vibration preventing apparatus does not correct roll vibration). Accordingly, when for example, the elevation angle is 90°, cos θ=0 and therefore, even if the rotation 22 about the axis 19 is detected, the correction for the result detected there cannot be effected (because it is roll correction). In other words, when the elevation angle is 90°, the detection of the rotation of the camera portion in yaw direction corresponds to the detection of the rotation in roll direction in the recorder portion and therefore becomes impossible. Accordingly, blur correction in yaw direction is impossible. With regard to pitch direction, as in the first embodiment, signal correction is not necessary.

Fifth Embodiment

A fifth embodiment of the present invention will now be described with reference to the drawings.

Figure 9:
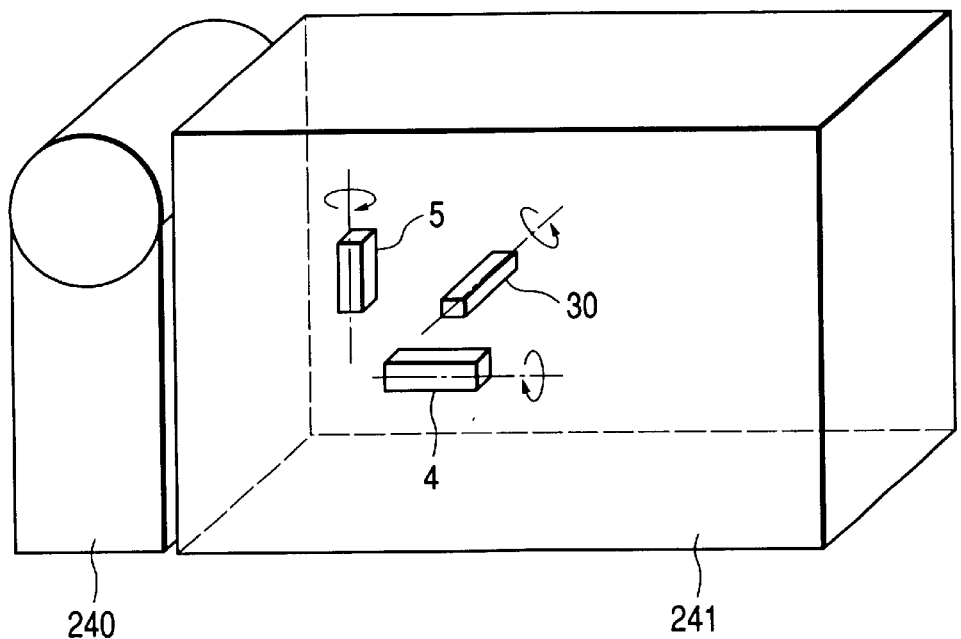
FIG. 9 is a perspective view of an image pickup apparatus according to a fifth embodiment of the present invention.

FIG. 9 is a perspective view of an image pickup apparatus according to the fifth embodiment of the present invention.

Figure 10:
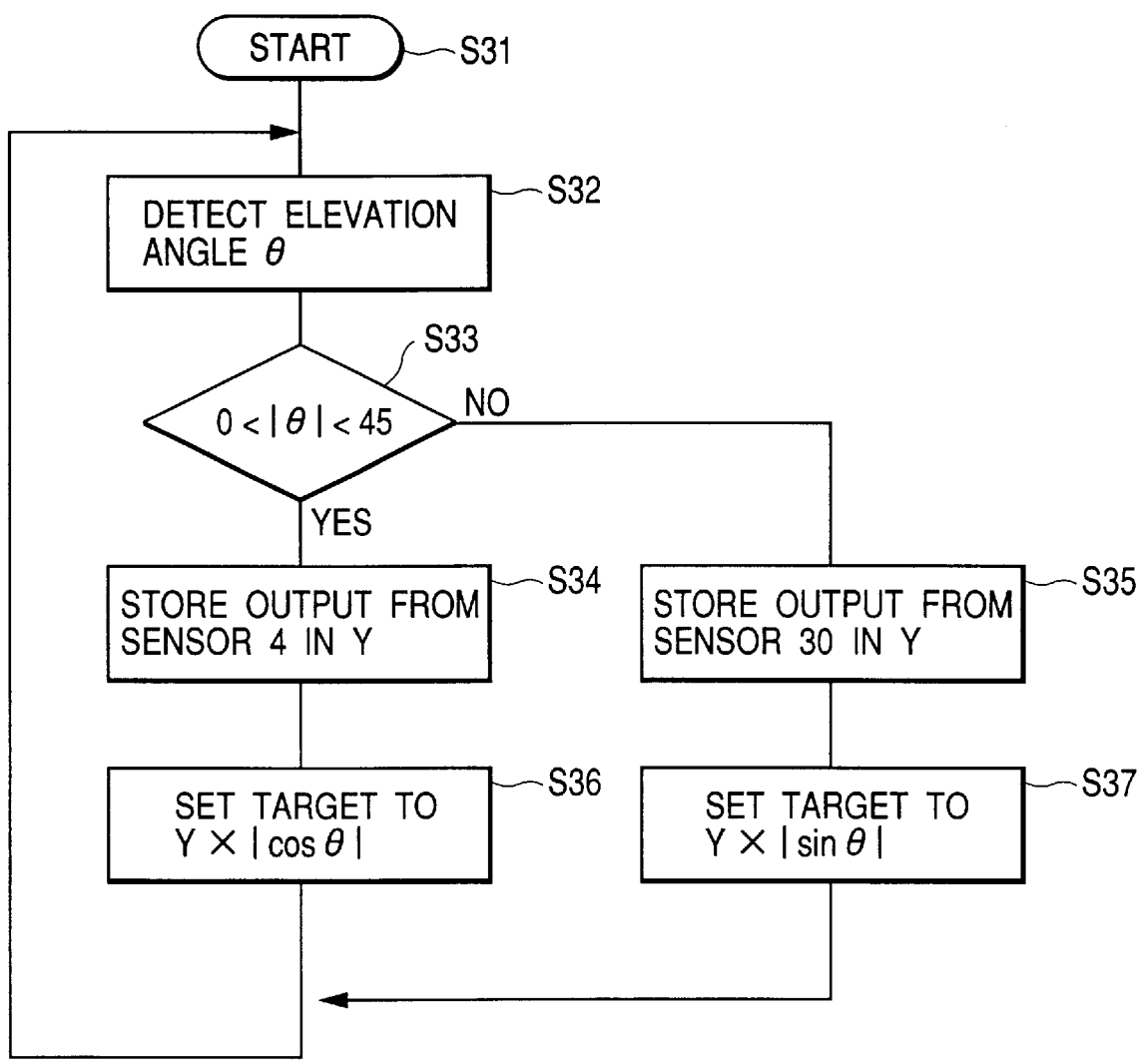
FIG. 10 is a flow chart of the elevation angle correcting operation of the image pickup apparatus shown in FIG. 9.
Figure 11A:
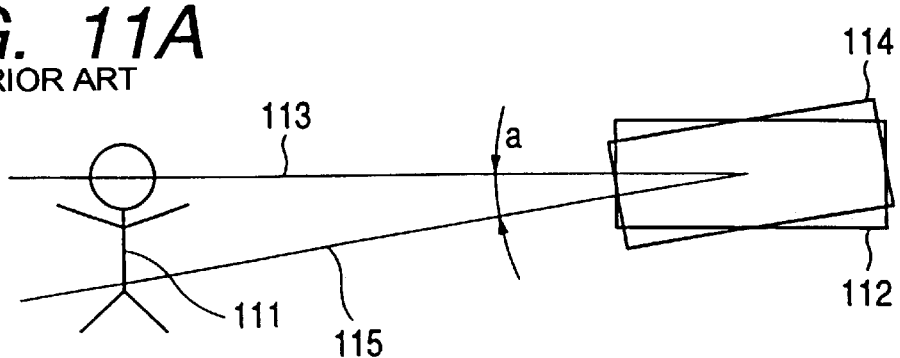
FIGS. 11A, 11B and 11C are illustrations of hand vibration in an image pickup apparatus according to the prior art.
Figure 11B:
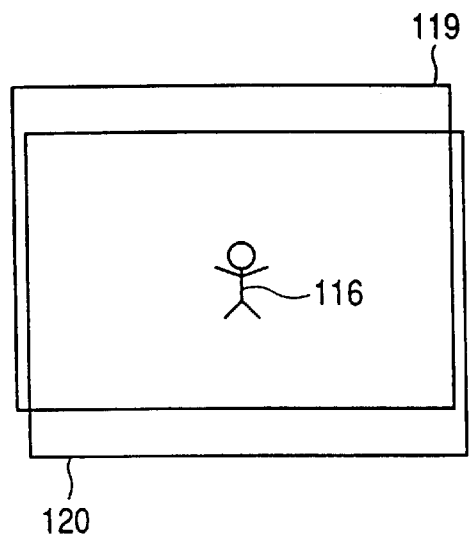
Figure 11C:
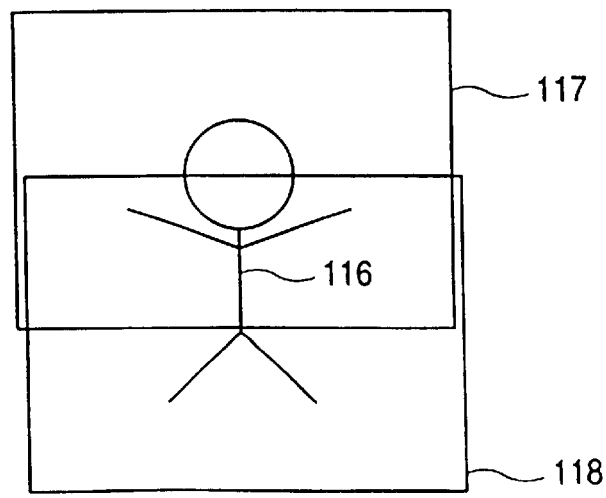
Figure 12A:
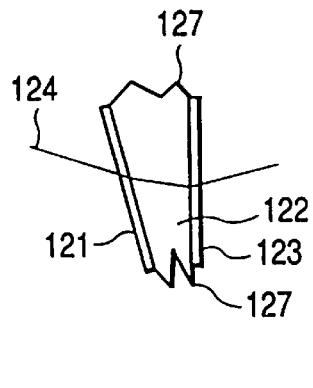
FIGS. 12A, 12B and 12C show the constructions of variable apex-angle prisms according to the prior art.
Figure 12B:
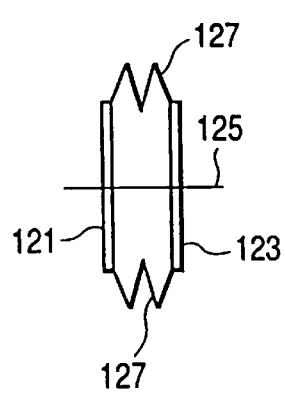
Figure 12C:
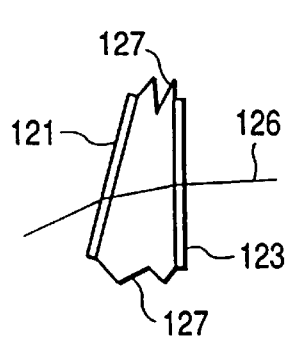
Figure 13A:
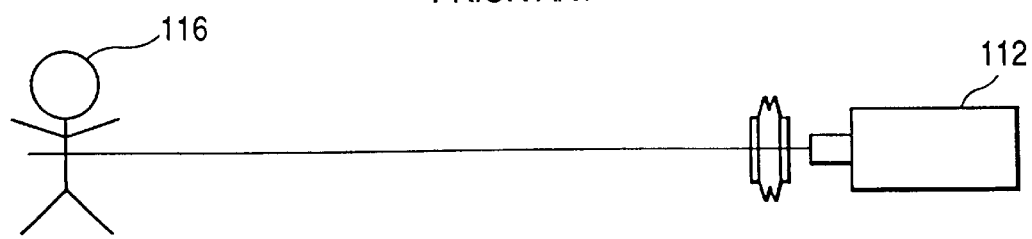
FIGS. 13A and 13B are illustrations of the blur correction by the variable apex-angle prisms shown in FIGS. 12A, 12B and 12C.
Figure 13B:
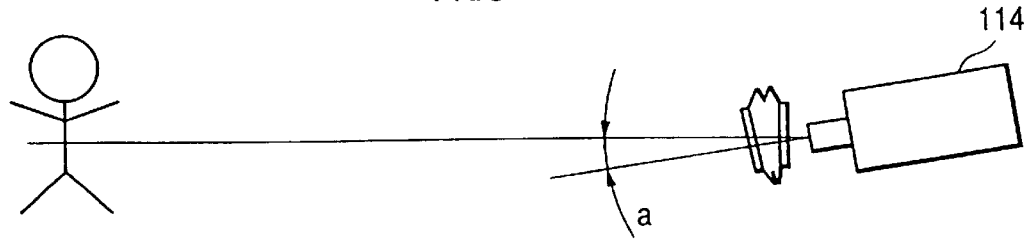
Figure 14:
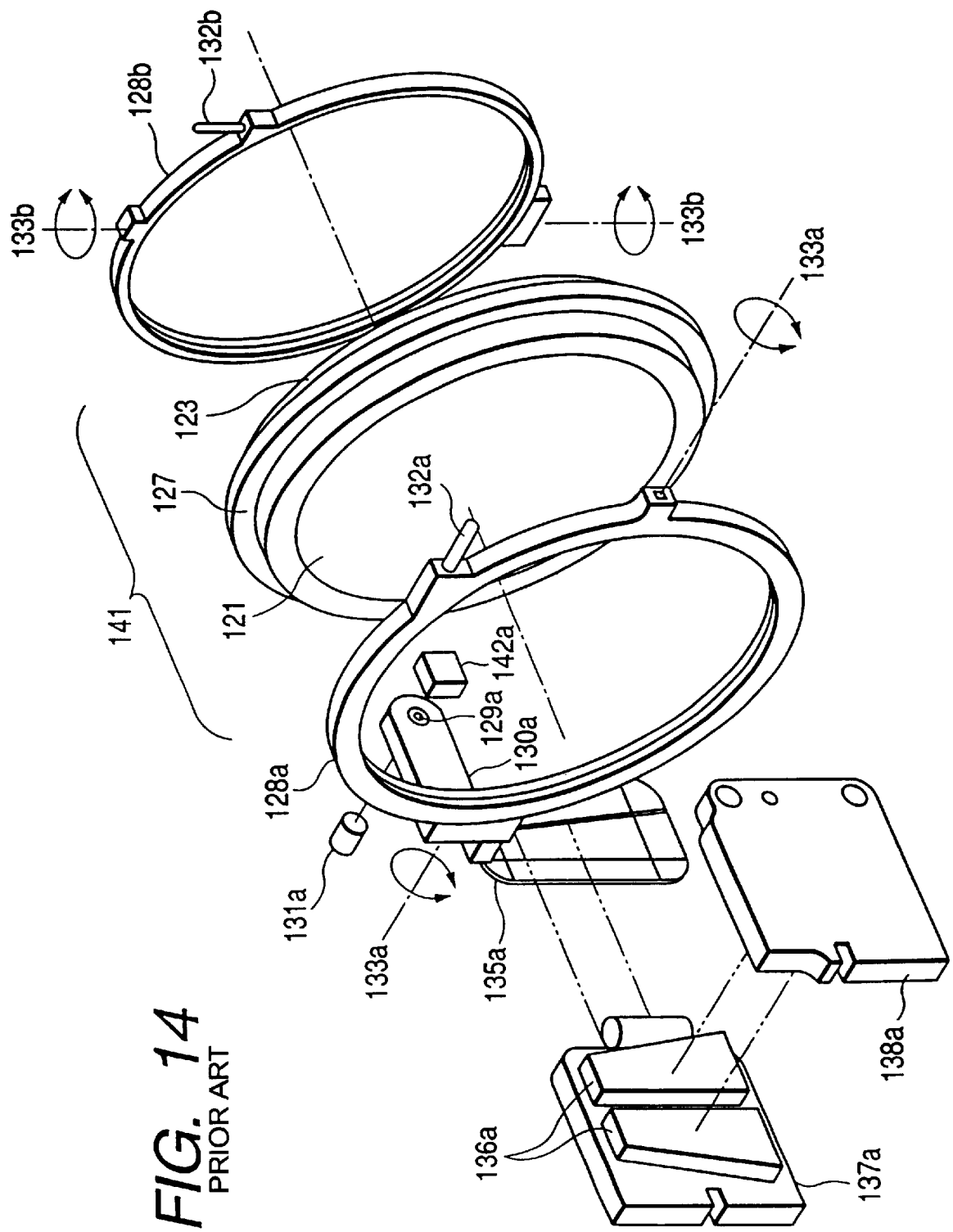
FIG. 14 is an exploded perspective view of a variable apex-angle prism unit according to the prior art.
Figure 15:
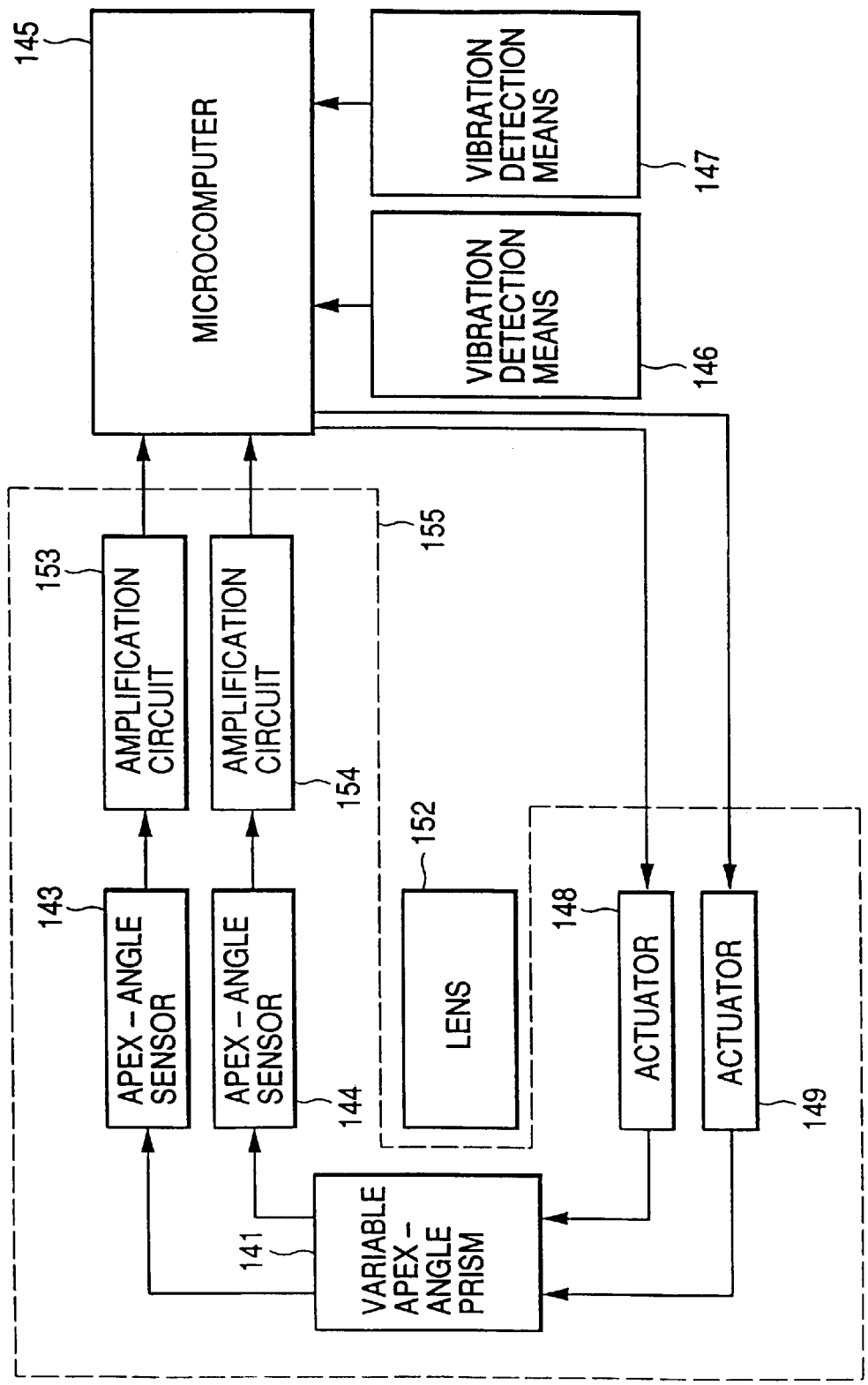
FIG. 15 is a block diagram of the vibration preventing apparatus of the image pickup apparatus according to the prior art.
Figure 16A:
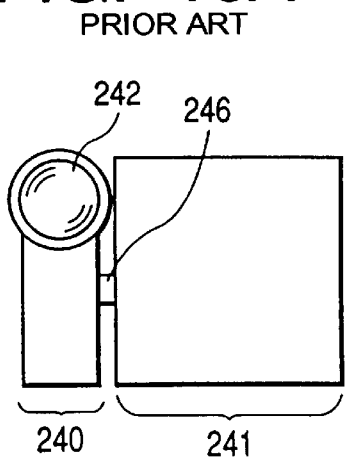
FIGS. 16A, 16B and 16C show the construction of an image pickup apparatus according to the prior art in which a camera portion is rotatable relative to a recorder portion.
Figure 16B:
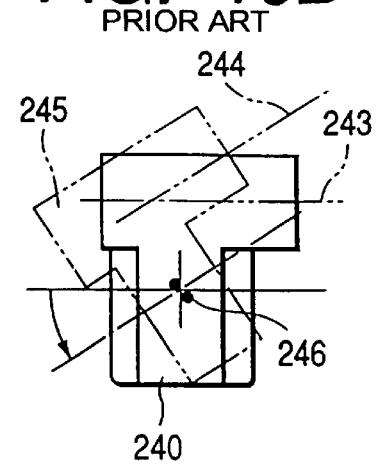
Figure 16C:
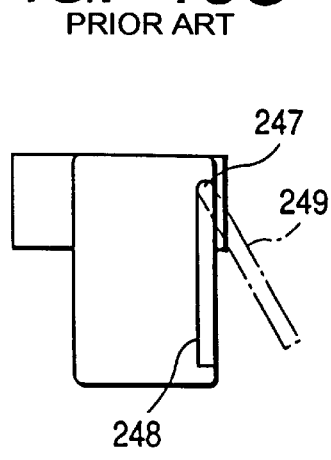
Figure 17B:
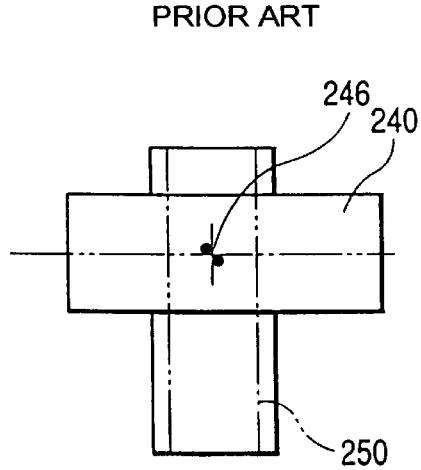
FIGS. 17A and 17B show the construction of an image pickup apparatus according to the prior art in which a downsized camera portion is rotatable relative to a recorder portion.
Figure 17A:
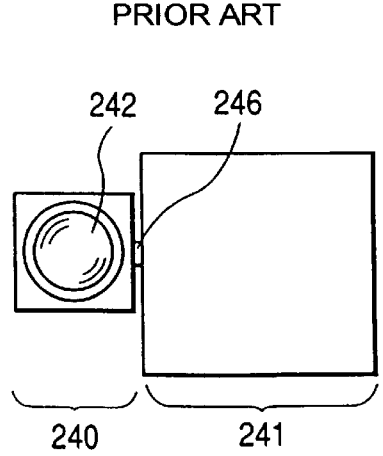

FIG. 10 is a flow chart of the elevation angle correcting operation of the image pickup apparatus shown in FIG. 9.

In FIG. 9, the reference numeral 30 denotes detection means for detecting vibration in roll direction when the elevation angle of the camera is 0°, and detecting vibration in yaw direction when the elevation angle of the camera is 90°, and pitch vibration detection means 4 for detecting vibration in pitch direction irrespective of the elevation angle state, and means 5 for detecting vibration in yaw direction coinciding with the yaw direction of the camera when the elevation angle is 0, and detecting vibration in roll direction when the elevation angle is 90°. These detection means in the three directions are disposed on the recorder 241 side.

The fifth embodiment shown in FIG. 9 is designed such that in order to reliably correct the vibration of the camera in yaw direction even in a state in which the elevation angle is 90° which was impossible in the aforedescribed embodiments, a sensor 30 for detecting vibration in roll direction (when the elevation angle is 0°, the direction of rotation about the optical axis) is provided on the recorder 241 side and by the result of the detection thereby, the vibration of the camera in yaw direction can be prevented even when the elevation angle is as great as 90°, and FIG. 9 shows an image pickup apparatus having the vibration detection means in these three directions disposed therein. The results of the detection by these three sensors 4, 5 and 30 are introduced into and processed in the microcomputer 12.

Operation will now be described with reference to FIG. 10.

First, the elevation angle correcting process is started (S31). Next, the elevation angle θ is detected by the elevation angle sensors (S32). Whether the absolute value of the detected elevation angle e is within a range of 0°–45° or within a range of 45°–90° (here, for simplicity, an elevation angle within a range of 0°–90° is supposed; actually, 360° can be likewise copied with) is judged (S33).

If the result of the judgment is 0°–45°, the sensor 4 of FIG. 9 is selected (S34), and the detected elevation angle is multiplied by |cos θ| to thereby effect elevation angle correction (S36).

If the result of the judgment at S33 is 45°–90°, the sensor 30 is selected (S35), and the correction of an elevation angle error in which the detected elevation angle is multiplied by |sin θ| is effected (S37).

Thus, according to the fifth embodiment, the vibration detection means in the three directions are provided so that the sensor output may be selected correspondingly to the elevation angle range and correction may be effected and therefore, even if the elevation angle becomes great, accurate blur correction can be carried out.

Other Embodiments

The vibration detection means 4, 5, etc. have hitherto been described with piezoelectric gyroscopes or the like taken as an example, but other means having equal performance and function such as an angular acceleration meter, an angular velocity meter and an angular displacement meter are also usable.

Also, optical type sensors such as iRED or PSD have hitherto been described as the apex-angle sensors 8 and 9 for detecting the apex-angle of the variable apex-angle prism or the like of the correction means, but use may also be made of a method of measuring the positional relation between the magnet and the coil by the use of a magnetic type sensor such as a Hall element.

Also, the circuits 10 and 11 for amplifying the outputs of the apex-angle sensors 8 and 9 may be eliminated depending on the types of the sensors.

Further, the two sheets of glass constituting the variable apex-angle prism 3 have been described as being driven about rotational axes differing by 90° from each other, but of course, use may be made of a system as disclosed in applicant's Japanese Laid-Open Patent Application No. 8-043769 wherein a sheet of glass is driven in any direction.

Furthermore, a system in which the variable apex-angle prism 3 and some lens units constituting the photo-taking lens are shift-driven in a plane perpendicular to the photo-taking optical axis has been described as the blur correction means, but a method whereby a lens unit is rotated with a predetermined center of rotation is also applicable.

Still further, optical means have been mentioned and described above as the blur correction means, but of course, blur correction is also possible by an electronic correction system used chiefly in moving picture correction based on the image processing technique.

Yet still further, the recorder portion of a video camera or a digital camera is applicable to all types including the VTR type using a video cassette, a tape or the like, various disc types and the semiconductor memory device type.

As described above, according to the present invention in an image pickup apparatus wherein a camera portion including at least a photo-taking lens, blur correction means and a solid state image pickup element is rotatable relative to a recorder portion, at least yaw side vibration detection means is disposed on the camera side and therefore, the vibration preventing apparatus need not effect correction conforming to the elevation angle of the camera, but it becomes possible to effect accurate blur correction.

Further, according to the present invention in an image pickup apparatus wherein a camera portion is rotatable relative to a recorder portion, at least vibration detection means in yaw direction is disposed under a photo-taking lens so as to be within the projection range of the lens and therefore, yaw side vibration detection means can be disposed efficiently and compactly within the camera.

Furthermore, according to the present invention in an image pickup apparatus wherein a camera portion is rotatable relative to a recorder portion, at least yaw side vibration detection means is disposed at substantially the same position as an actuator for driving correction means as the camera is viewed from ahead thereof and therefore, efficient layout eliminating the wasteless space for the camera portion becomes possible.

Still further, according to the present invention in an image pickup apparatus wherein a camera portion is rotatable relative to a recorder portion, design is made such that when vibration detection means in yaw direction is also disposed on the recorder side because it cannot be disposed on the camera side by the reason of downsizing or the like, camera elevation angle detection means is provided and vibration detection means is corrected by the result of the detection by the elevation angle detection means and therefore, it becomes possible to effect right blur correction even when vibration detection means in yaw direction is absent on the camera side.

Yet still further, according to the present invention in an image pickup apparatus wherein a camera portion is rotatable relative to a recorder portion, when vibration detection means in yaw direction cannot be disposed in the camera portion, vibration detection means in three directions including roll direction are provided on the recorder side and therefore, even when the elevation angle of the camera is as great as 90° or so, highly accurate blur correction becomes possible independently of any change in elevation angle.

The individual components shown in a schematic or block form in the drawings are all well-known in the camera art and their specific construction and operation are not critical to the operation or best mode for carrying out the invention.

While the present invention has been described with respect to what is presently considered to be the preferred embodiments, it is to be understood that the invention is not restricted to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus having an image blur correcting function comprising:

image blur correction means for correcting image blur;

a first unit including said image blur correction means;

a second unit rotatable about a first axis differing from a photo-taking optical axis relative to said first unit;

vibration detection means provided in said second unit for detecting rotational vibration about said first axis; and control means for operating said image blur correction means in conformity with the output of said vibration detection means.

2. An apparatus according to claim 1, wherein said control means includes means for responding in a similar manner to the output of said vibration detection means irrespective of the rotated state of said second unit relative to said first unit.

3. An apparatus according to claim 1, further comprising:

second vibration detection means for detecting rotational vibration about a second axis differing from both of said photo-taking optical axis and said first axis;

said control means including means for operating said image blur correction means in conformity with the output of said second vibration detection means.

4. An apparatus according to claim 3, wherein said second vibration detection means is provided in said second unit.

5. An apparatus according to claim 4, wherein said control means includes means for correcting the output signal of said second vibration detection means in conformity with the rotated state of said second unit relative to said first unit, and operating said image blur correction means in conformity with said corrected signal.

6. An apparatus according to claim 5, wherein said control means includes means for finding a component corresponding to the rotational vibration of said first unit about said second axis, in conformity with the rotated state of said second unit relative to said first unit, and the output signal of said second vibration detection means.

7. An apparatus according to claim 3, wherein said second axis is perpendicular to said photo-taking optical axis.

8. An apparatus according to claim 3, wherein said first and second axes are perpendicular to each other.

9. An apparatus according to claim 1, wherein said first axis is perpendicular to said photo-taking optical axis.

10. An apparatus according to claim 1, wherein said first unit holds a photo-taking optical system and an image pickup element.

11. An apparatus according to claim 10, wherein said second unit holds a monitor for displaying an image corresponding to an image formed by said image pickup element.

12. An apparatus according to claim 1, wherein said image blur correction means includes means for optically correcting image blur.

13. An apparatus according to claim 12, wherein said image blur correction means includes means for deflecting a light beam to thereby correct image blur.

14. An apparatus according to claim 13, wherein said image blur correction means includes a variable apex-angle prism.

15. An apparatus having an image blur correcting function comprising:

image blur correction means for correcting image blur;

a first unit including said image blur correction means;

a second unit rotatable about a first axis differing from a photo-taking optical axis relative to said first unit;

vibration detection means provided in said second unit for detecting rotational vibration about a second axis differing from both of said photo-taking optical axis and said first axis;

signal correction means for correcting the output signal of said vibration detection means in conformity with the rotated state of said second unit relative to said first unit; and control means for operating said image blur correction means in conformity with a vibration signal obtained by said signal correction means.

16. An apparatus according to claim 15, wherein said signal correction means includes means for effecting a calculation for finding a component corresponding to the rotational vibration of said first unit about said second axis, from the output signal of said vibration detection means in conformity with the rotated state of said second unit relative to said first unit.

17. An apparatus according to claim 15, further comprising:

second vibration detection means for detecting the vibration about said first axis, said second vibration detection means being provided in said second unit, said control means including means for responding in a similar manner to the output of said second vibration detection means, irrespective of the rotated state of said second unit relative to said first unit.

18. An apparatus according to claim 15, wherein said first unit holds a photo-taking optical system and an image pickup element.

19. An apparatus according to claim 18, wherein said second unit holds a monitor for displaying an image corresponding to an image formed by said image pickup element.

* * * * *

UNITED STATES PATENT AND TRADEMARK OFFICE
CERTIFICATE OF CORRECTION

PATENT NO. : 6,486,910 B1
DATED : November 26, 2002
INVENTOR(S) : Naoya Kaneda et al.

It is certified that error appears in the above-identified patent and that said Letters Patent is hereby corrected as shown below:

Column 4,
Line 45, "piezo-electric" should read -- piezoelectric --.

Column 9,
Line 13, "laying out them" should read -- laying them out --.

Column 11,
Line 28, "angle e" should read -- angle $\theta$ --.

Signed and Sealed this

Twenty-fourth Day of June, 2003

JAMES E. ROGAN
*Director of the United States Patent and Trademark Office*